(12) United States Patent
Kinoshita et al.

(10) Patent No.: US 7,744,223 B2
(45) Date of Patent: Jun. 29, 2010

(54) OPTICAL DEVICE AND PROJECTOR

(75) Inventors: Satoshi Kinoshita, Matsumoto (JP);
Makoto Zakoji, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 729 days.

(21) Appl. No.: 11/625,563

(22) Filed: Jan. 22, 2007

(65) Prior Publication Data

US 2007/0206158 A1 Sep. 6, 2007

(30) Foreign Application Priority Data

Mar. 6, 2006 (JP) ............................. 2006-059965

(51) Int. Cl.
*G03B 21/18* (2006.01)
*G02F 1/1333* (2006.01)

(52) U.S. Cl. ........................................ 353/54; 349/161
(58) Field of Classification Search ................... 353/52, 353/54; 349/161
See application file for complete search history.

(56) References Cited

U.S. PATENT DOCUMENTS 5,170,195 A * 12/1992 Akiyama et al. ............... 353/54
6,523,959 B2 * 2/2003 Lee et al. ...................... 353/52

FOREIGN PATENT DOCUMENTS

| JP | A 2002-131737 | 5/2002 |
| JP | A 2003-195253 | 7/2003 |
| JP | A 2005-227353 | 8/2005 |
| JP | A 2006-154721 | 6/2006 |

* cited by examiner

*Primary Examiner*—Georgia Y Epps
*Assistant Examiner*—Danell L Owens
(74) *Attorney, Agent, or Firm*—Oliff & Berridge, PLC

(57) ABSTRACT

An optical device includes: a light modulation element that modulates a luminous flux emitted from a light source; a casing that houses the light modulation element; a holding member that holds the light modulation element and exposes a part thereof to outside; a refrigerant housed in a housing space surrounded by the casing, the holding member and the light modulation element; and a convection start unit that is provided in the casing and causes convection of refrigerant.

14 Claims, 12 Drawing Sheets

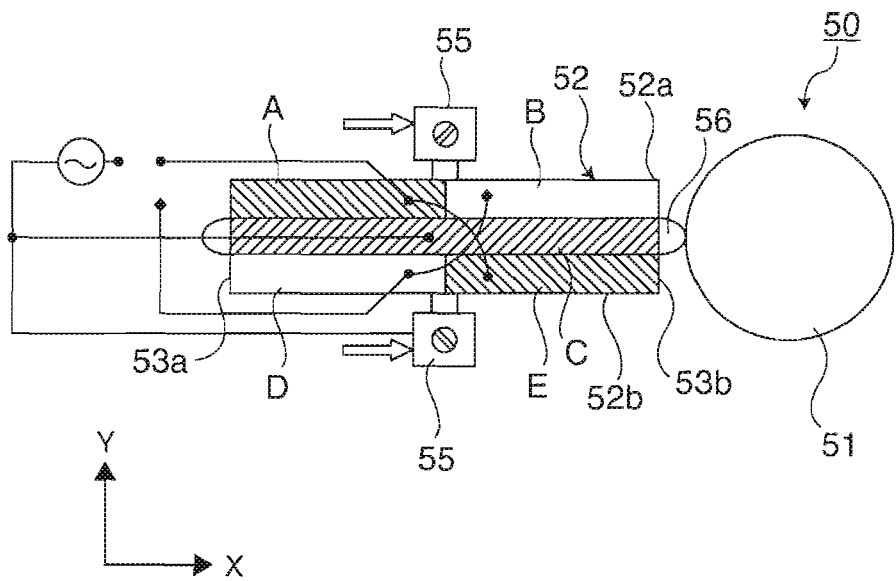
FIG. 6
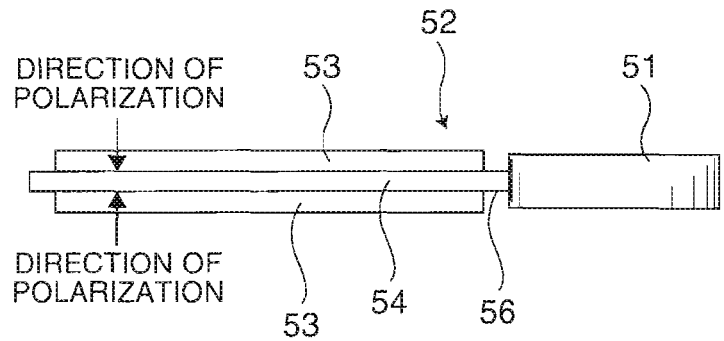
FIG. 7
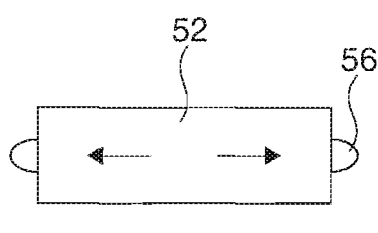 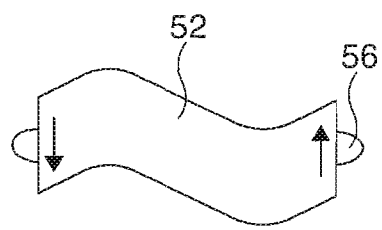
FIG. 8A     FIG. 8B

OPTICAL DEVICE AND PROJECTOR

BACKGROUND

1. Technical Field

This invention relates to an optical device and a projector.

2. Related Art

Recently, there has been an image display device using a light modulation element in which light emitted from a light source is cast to a light modulation element such as a liquid crystal panel, the incident light is modulated by the light modulation element, and then the modulated light is projected onto a screen. In such an image display device, the light except for the light projected onto the screen is absorbed by the light modulation element and its peripheral optical elements, generating heat. Thus, a device having a cooler using a gas for radiating the generated heat has been proposed. However, as the density of semiconductors becomes higher, the calorific value per unit volume increases and the cooling with a gas cannot realize sufficient radiation. Therefore, cooling devices using a liquid have been proposed, as disclosed in JP-A-2003-195253, JP-A-2005-227353 and JP-A-2002-131737.

In the projector disclosed in JP-A-2003-195253, a polarizer is cooled by using ethyleneglycol as a refrigerant. Specifically, the heat generated from the polarizer is transmitted to a refrigerant filling a refrigerant-filled part and the refrigerant heated by the heat rises because of the lowered density, causing free convection within the refrigerant. The heat transferred by this convection performs heat exchange with external air, thereby cooling the polarizer.

The projector disclosed in JP-A-2005-227353 has a fluid circulation member through which a refrigerant flows. A cooled fluid is sent to the fluid circulation member from a main tank and this cooling fluid is branched and thus sent into three light modulation element holding bodies by a fluid branching unit. This causes the heat generated from a liquid crystal panel and a polarizer to be transmitted to the cooled fluid in the fluid circulation member. Then heated cooling fluid is sent to a radiator, and when passing through a tubular member of the radiator, the cooling fluid is transmitted to a radiation fin and gets cooled.

In the projector disclosed in JP-A-2002-131737, a liquid crystal panel for red light, a liquid crystal panel for green light, a liquid crystal panel for blue light, and their respective light incident-side polarizers and light exiting-side polarizers are arranged within a rectangular box-shaped cooling container. A refrigerant is sealed in this cooling container, and as this refrigerant is forcedly circulated by a stirring unit the refrigerant absorbs the heat generated from a polarization element and a liquid crystal panel. The heat absorbed by the refrigerant moves to the inner wall surface of the cooling container and performs heat exchanges with external air by using a cooling fin provided on the outer surface of the cooling container.

The above techniques have the following problems. That is, in the projector disclosed in JP-A-2003-195253, since the polarizer is cooled by using free convection, it is difficult to sufficiently cool the polarizer.

In the projector disclosed in JP-A-2005-227353, since plural fluid circulation members are used for cooling the light modulation element, the configuration is complicated by the connection of these members. Also, the refrigerant may leak from the connecting parts of the fluid circulation n embers and dust may enter the fluid circulation members because of the connection of the fluid circulation members.

In the liquid display device disclosed in JP-A-2002-131737, since an entire liquid crystal display unit is immersed in a refrigerant, the refrigerant may enter the liquid crystal panel. Also, since three liquid crystal panels are arranged within one cooling container, assembly of the liquid crystal display device is difficult. Maintenance is difficult when one of the liquid crystal panels has trouble, and the other liquid crystal panels may also have trouble.

SUMMARY

An advantage of some aspects of the invention is to provide an optical device and a projector in which entry of dust or the like into the refrigerant that cools the light modulation element is prevented and in which the entire device is miniaturized.

According to a first aspect of the invention, an optical device includes: a light modulation element that modulates a luminous flux emitted from a light source; a casing that houses the light modulation element; a holding member that holds the light modulation element and exposes a part thereof to outside; a refrigerant housed in a housing space surrounded by the casing, the holding member and the night modulation element; and a convection start unit that is provided in the casing and causes convection of refrigerant.

In the optical device according to the first aspect of the invention, first, the convection start unit caused forced convection of the refrigerant in the housing space. This causes the heat generated in the light modulation element to be transmitted to the refrigerant, and the heated refrigerant flows toward the holding member. Since a part of the holding member is exposed to outside, the heat of the refrigerant is radiated outward via the holding member. After that, the refrigerant, having its heat radiated outward and thus cooled, absorbs the heat of the light modulation element again via the convection start unit, and then the heat is radiated by the holding member. As this is repeated, the light modulation element is efficiently cooled. Moreover, since the light modulation element is held by the holding member, the heat of the light modulation element can be radiated directly outward by the holding member.

Thus, according to this aspect of the invention, since the convection start unit and the radiator are entirely housed in the casing, the optical device with a cooling function can be easily assembled, compared with a traditional case where a convection start unit that sends out a refrigerant and a radiator that radiates heat are provided outside of a casing. Also, since heat receiving and radiation are carried out within the casing, the device has no connecting part of circulation members that circulate a refrigerant to a light modulation element, which would be necessary in the case where the convection start unit and the radiator are provided outside. Therefore, the refrigerant will not leak on its way toward the convection start unit and the radiator, and dust, bubbles and the like will not enter the refrigerant. Moreover, since no circulation members are necessary, the device is not bulky and can be miniaturized even when a liquid refrigerant is used.

By assembling the optical device including the refrigerant in the process of assembling a traditional light modulation element in a clean room, it is possible to cool the light modulation element with the refrigerant in which no dust, bubbles or the like are present. When this optical device is used for a display device of a projector or the like, the image quality will not be deteriorated. Therefore, the reliability of the entire device can be improved.

It is preferable that, in the optical device according to this aspect of the invention, the convection start unit is provided on the holding member.

In the optical device according to this aspect of the invention, since the convection start unit is provided on the holding member that carries out radiation and heat receiving, the refrigerant in the housing space can be efficiently circulated and the heat can be radiated by the holding member. Also, since the holding member that holds the convection start unit need not be additionally provided, the number of components can be restrained.

It is also preferable that, in the optical device according to this aspect of the invention, the light modulation element is a transmissive liquid crystal element, and that a refrigerant reservoir which stores a part of the refrigerant is provided around an image forming area of the light modulation element in the housing space, and the convection start unit is provided in the refrigerant reservoir.

In the optical device according to this aspect of the invention, in the refrigerant reservoir provided around the image forming area of the light modulation element, the heat generated from the light modulation element is transmitted to the refrigerant. In this manner, the refrigerant that is caused to flow by the convection start unit receives heat in the area around the image forming area of the light modulation element. Therefore, as the refrigerant reservoir is provided around the image forming area and the convection start unit is provided in this refrigerant reservoir, unevenness in temperature of the refrigerant in the image forming area can be restrained. That is, since the light modulation element is a transmissive liquid crystal element, an optical image having no unevenness in luminance can be formed when a luminous flux passes through the light modulation element.

It is also preferable that, in the optical device according to this aspect of the invention, a polarization member is provided on an outer side of a cover glass that forms the housing space.

In the optical device according to this aspect of the invention, since the polarization member provided on the outer side of the cover glass that forms the housing space can be cooled by the refrigerant in the housing space at the same time when the light modulation element is cooled, the polarization member can be cooled without providing any particular unit for cooling the polarization member. That is, the number of components can be reduced and the cost of the entire device can be reduced. Also, since the polarization member is provided on the casing that is outside of the housing space, the polarization member can be cooled without causing the polarization member to directly contact the refrigerant. Therefore, degradation of the polarization member due to contact with the refrigerant can be restrained.

It is also preferable that, in the optical device according to this aspect of the invention, a rectifying member that rectifies the flow of the refrigerant is provided in the housing space.

In the optical device according to this aspect of the invention, since the rectifying member is formed in the housing space, the refrigerant in the housing space can be spread therein, and the heated refrigerant can be prevented from locally staying in the housing space or from forming a deflected flow. Therefore, unevenness in temperature in the image forming area of the light modulation element can be restrained and the light modulation element can be cooled more efficiently. Thus, an optical device capable of improving the display property can be provided.

It is also preferable that, in the optical device according to this aspect of the invention, a driving unit that drives the convection start unit is provided outside of the casing.

In the optical device according to this aspect of the invention, as the driving unit is provided outside of the casing, entry of dust into the refrigerant in the housing space can be prevented even when dust is generated by the driving unit.

It is also preferable that, in the optical device according to this aspect of the invention, the driving unit is an electromagnetic motor or piezoelectric ultrasonic motor.

In the optical device according to this aspect of the invention, as an electromagnetic motor or piezoelectric ultrasonic motor is used as the driving unit, the refrigerant in the housing space can be circulated without increasing the size of the device.

It is also preferable that, in the optical device according to this aspect of the invention, a radiation fin is provided at the part of the holding member that is exposed outward from the casing.

In the optical device according to this aspect of the invention, the heat generated from the light modulation element can be efficiently radiated outward by the radiation fin provided on the holding member.

According to a second aspect of the invention, a projector includes: a light source that emits light; plural optical devices that include the above-described optical device; a light combining unit that has lateral side which is arranged along the plural optical devices, and combines color lights emitted from the plural optical devices; and a projection unit that projects an optical image combined by the light combining unit.

In the projector according to this aspect of the invention, light emitted from the light source becomes incident on each of the optical devices. The light incident on the optical devices is modulated in accordance with image information, and the modulated optical image is projected by the projection unit. Therefore, as the optical devices which suppress entry of dust into the refrigerant are provided, a projector that can project a sharper image and that has high heat resistance and reliability can be provided.

It is preferable that, in the projector according to this aspect of the invention, a radiation unit in contact with the holding members of the plural optical devices is provided.

In the projector according to this aspect of the invention, for example, if the light modulation element has a large calorific value, the radiation unit in contact with the holding members can efficiently radiate this neat outward.

It is also preferable that, in the projector according to this aspect of the invention, the light combining unit is a dichroic prism and the radiation unit is provided on a surface of the dichroic prism where the plural optical devices are not provided.

In the projector according to this aspect of the invention, as the radiation unit is provided on the surface of the dichroic prism where the plural optical devices are not provided, the radiation by the dichroic prism and the radiation by the holding members can be made common and a projector that is further miniaturized can be provided.

BRIEF DESCRIPTION OF THE DRAWINGS

The invention will be described with reference to the accompanying drawings, wherein like numbers reference like elements.

FIG. 6 is a plan view showing a driving unit of an optical device according to a second embodiment of the invention.

FIG. 7 is a side view showing the driving unit of the optical device of FIG. 6.

FIGS. 8A and 8B show movement of the driving unit of the optical device of FIG. 6.

DESCRIPTION OF EXEMPLARY EMBODIMENTS

Hereinafter, optical devices and projectors according to embodiments of the invention will be described with reference to the drawings. In the following drawings, the scale of each member is appropriately changed in order to show each member in a recognizable size.

First Embodiment

An optical device according to a first embodiment of the invention will be described with reference to FIGS. 1 to 5.

Figure 1:
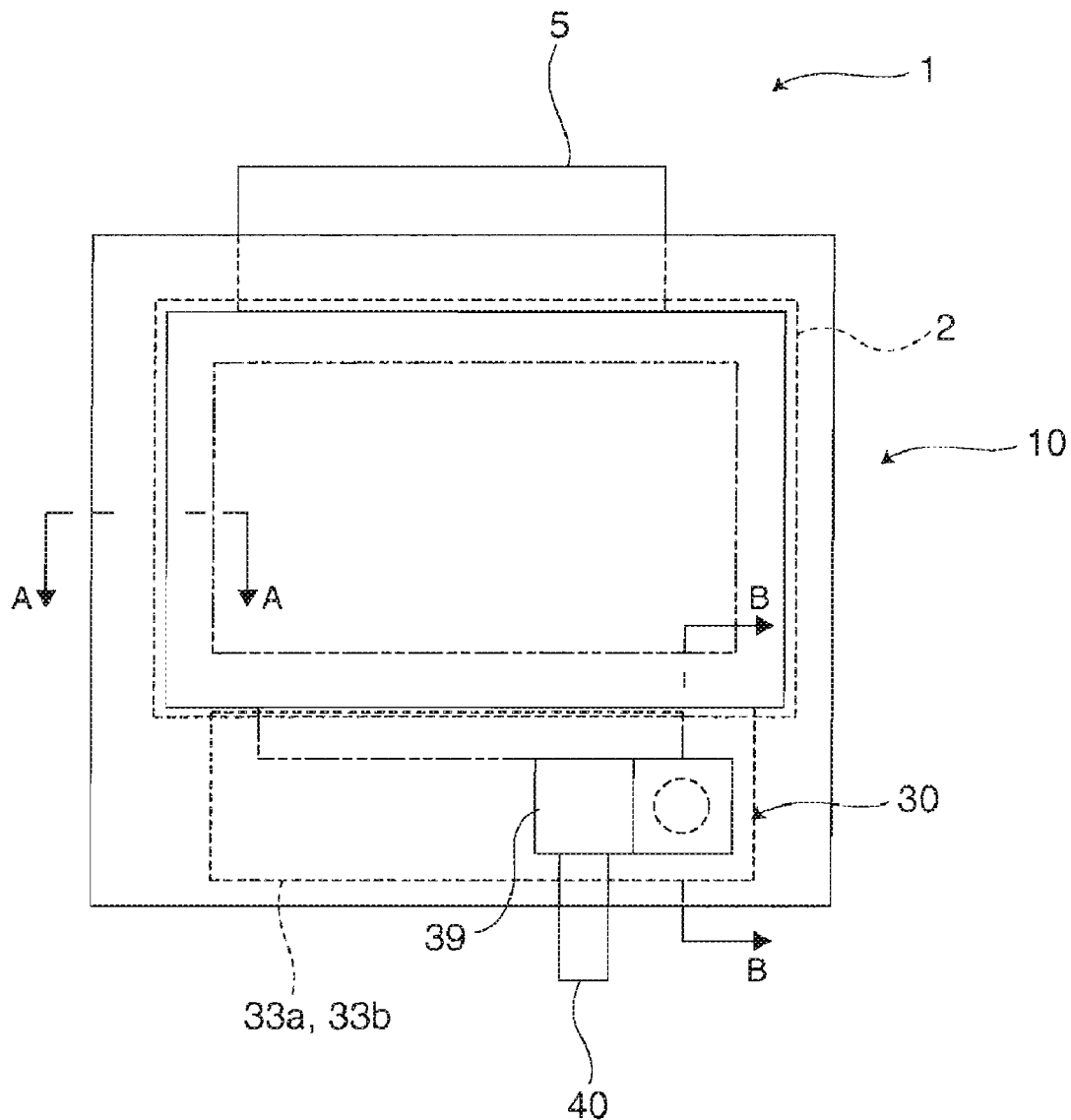
FIG. 1 is a plan view showing a schematic configuration of an optical device according to a first embodiment of the invention.
Figure 2:
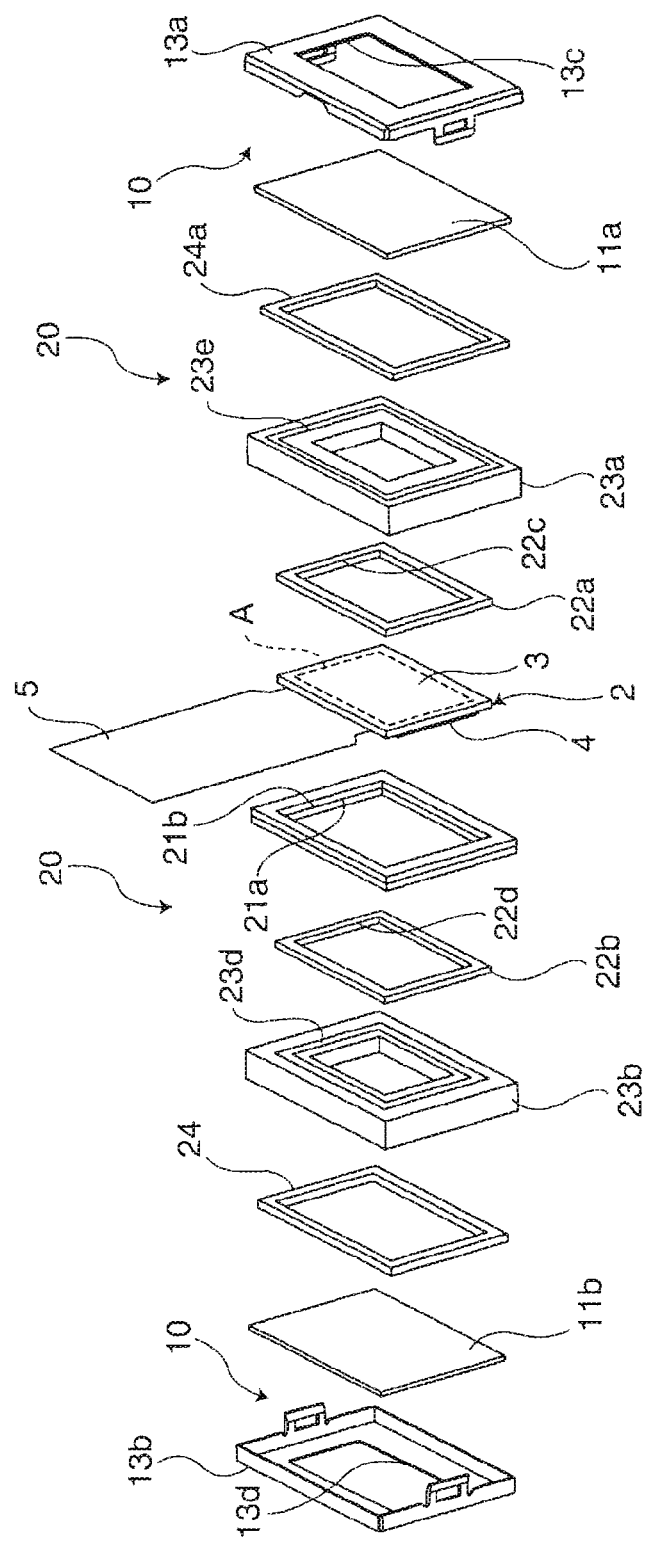
FIG. 2 is an exploded perspective view showing essential parts of the optical device according to the first embodiment of the invention.
Figure 3:
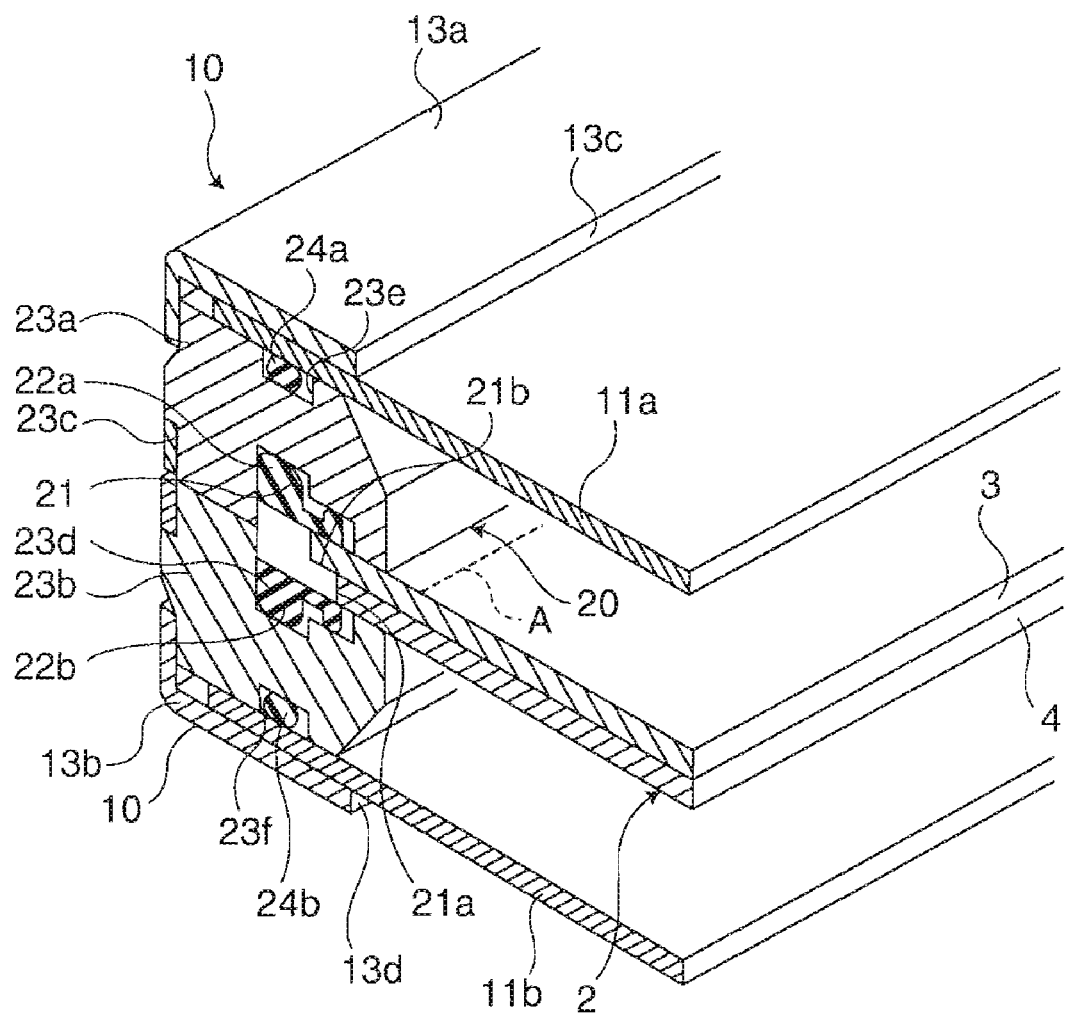
FIG. 3 is a sectional view taken along line A-A of the optical device of FIG. 1.
Figure 4:
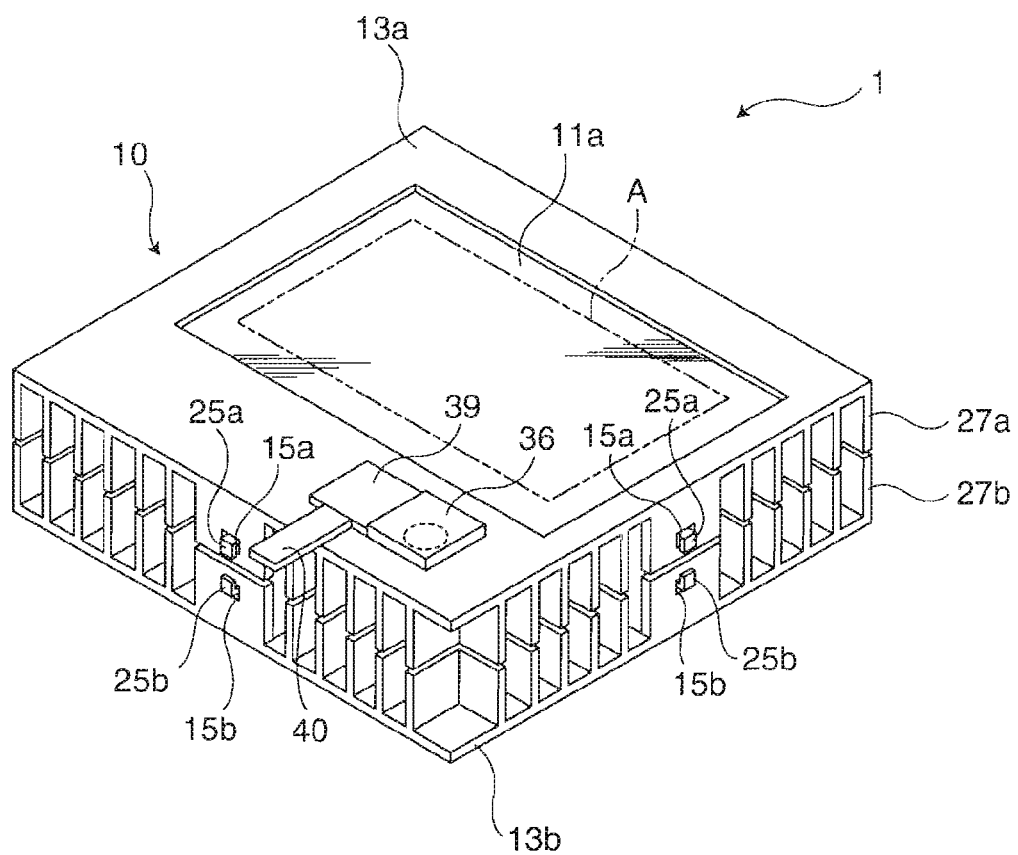
FIG. 4 is a perspective view showing a schematic configuration of the optical device of FIG. 1.
Figure 5:
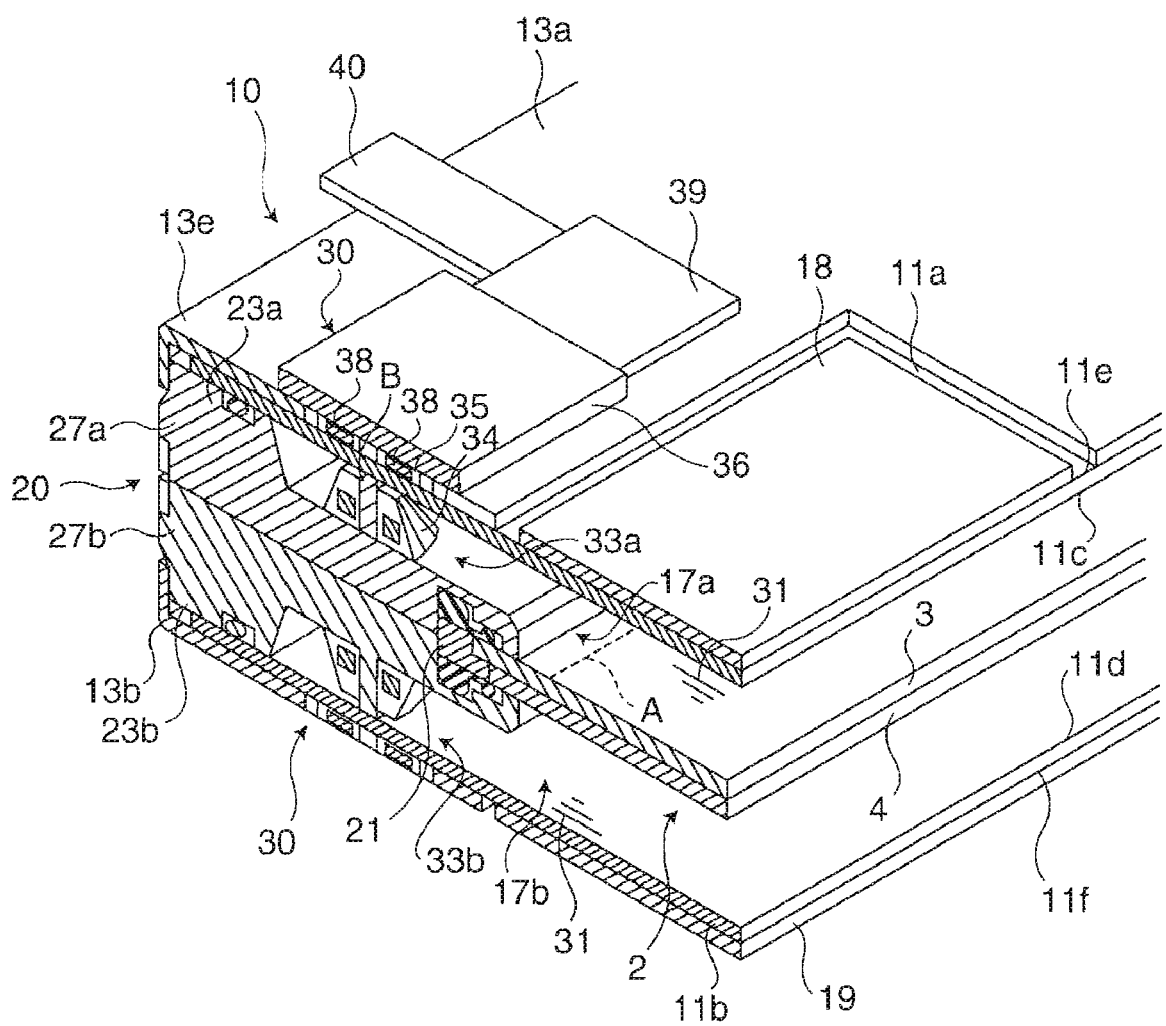
FIG. 5 is a view taken along line B-B of the optical device 1.
Figure 9:
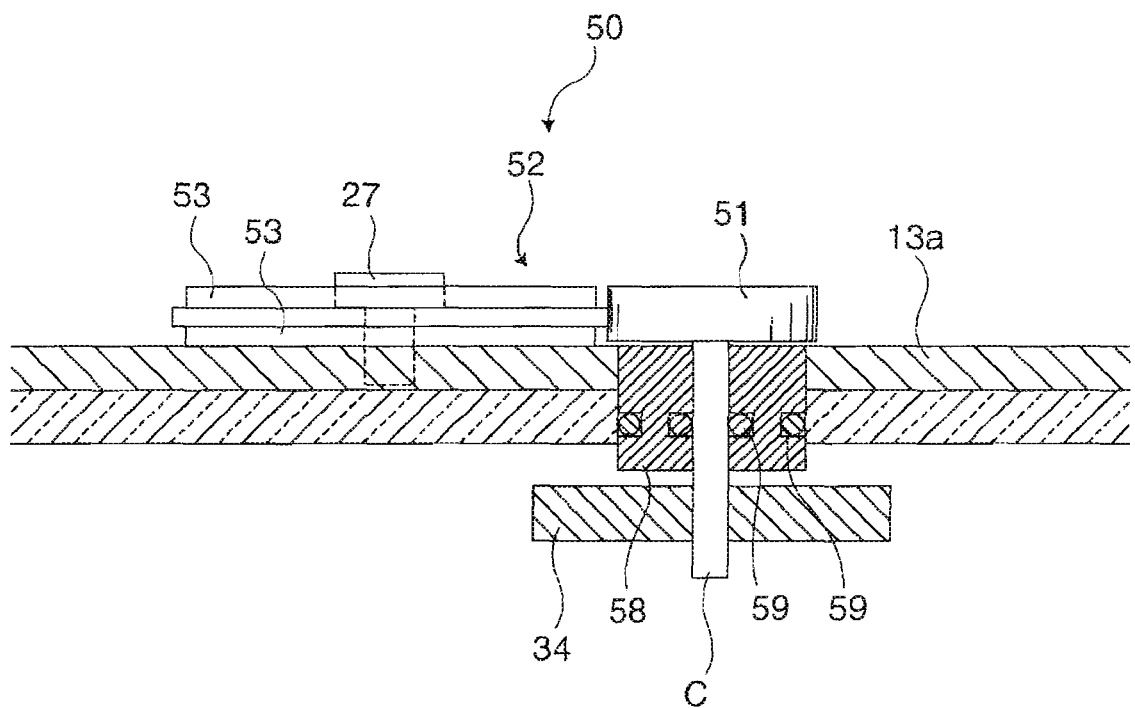
FIG. 9 is a sectional view of essential parts showing fixation of the optical device of FIG. 6.

FIG. 1 is a plan view showing a schematic configuration of the optical device according to this embodiment. FIG. 2 is an exploded perspective view showing essential parts of the optical device of FIG. 1. FIG. 3 is a sectional view taken along line A-A of the optical device of FIG. 1. FIG. 4 is a perspective view of the optical device of FIG. 1. FIG. 5 is a view taken along line B-B of the optical device of FIG. 1.

A liquid crystal light valve unit (optical device) 1 has a liquid crystal light valve (light modulation element) 2 that modulates a luminous flux emitted from a light source, a holding unit (holding member) 20 that holds the liquid crystal light valve 2, and a convection driving unit 30 that circulates a refrigerant (cooling medium) 31, with the liquid crystal light valve 2, the holding unit 20 and the convection driving unit 30 being provided within a casing 10, as shown in FIG. 1 and 5.

The liquid crystal light valve 2 has a structure in which an area provided between a TFT board 3 and a counter-board 4 is filled with liquid crystal (not shown), as shown in FIG. 2. The liquid crystal light valve 2 is also provided with a light valve FPC (flexible printed circuit) 5 as a flexible board connected to a projector body (not shown).

The casing 10 is provided to hold the holding unit 20 from both sides, as shown in FIG. 2.

First, the holding unit will be described.

The holding unit 20 has a supporting frame 21 that supports the liquid crystal light valve 2, a pair of liquid crystal panel packings 92a, 22b made of an elastic material and arranged to hold the supporting frame 21 between them, and a pair of holding frames 23a, 23b arranged to hold the liquid crystal panel packings 22a, 22b between them, as shown in FIG. 2.

The supporting frame 21 is formed by a plate unit that is rectangular in a plan view, and a rectangular aperture 21a that can fit with the liquid crystal light valve 2 is formed therein, as shown in FIGS. 2 and 3. This aperture 21a has a step part 21b formed therein. The liquid crystal light valve 2 is fixed by filling this step part 21b with an adhesive. The supporting frame 21 is constructed in contact with the holding frames 23a, 23b, as shown in FIG. 3.

The liquid crystal panel packings 22a, 22b have apertures 22c, 22d of a size corresponding to an image forming area A, as shown in FIG. 2. An elastic silicon rubber can be employed for the liquid crystal panel packings 22a, 22b. For the liquid crystal panel packings 22a, 22b, not only a silicon rubber but also a butyl rubber or fluorine rubber having less moisture transmission may be used.

On the surfaces of the first and second holding frames 33a, 23b on the side where the liquid crystal light valve 2 is arranged, recessed parts 23c, 23d are formed, as shown in FIG. 3. The first and second liquid crystal panel packings 22a, 22b and the supporting frame 21 are arranged in these recessed parts 23c, 23d, thus holding the liquid crystal light valve 2 between them.

On the surfaces of the first and second holding frames 23a, 23b opposite to the side where the liquid crystal light valve 2 is arranged, rectangular groove parts 23e, 23f are provided. First and second glass packings 24a, 24b are provided in these groove parts. In this manner, the first and second holding frames 23a, 23b are provided substantially symmetrically on both sides of the liquid crystal light valve 2.

Thus, this holding unit 20 is constructed to prevent the refrigerant 31 from entering the liquid crystal of the liquid crystal light valve 2.

The supporting frame 21 and the holding frames 23a, 23b are made of aluminum. However, they may be made of a metal material having high thermal conductivity, for example, a metal material such as Cu, Al, Fe or Mg, or an alloy containing these metals.

Next, the casing will be described.

The casing 10 has a first cover glass 11a provided toward the TFT board 3 of the liquid crystal light valve 2, a second cover glass 11b provided toward the counter-board 4 of the liquid crystal light valve a first fixing frame 13a that fixes the first cover glass 11a and the first holding frame 23a via the first glass packing 24a, and a second fixing frame 13b that fixes the second cover glass 11b and the second holding frame 23b via the second glass packing 24b, as shown in FIG. 3.

In the first and second fixing frames 13a, 13b, apertures 13c, 13d larger than the image forming area A of the liquid crystal light valve 2 are formed, and a luminous flux can be incident through them.

The liquid crystal light valve 2 is provided with a space between the first cover glass 11a and the second cover glass 11b, and the lateral sides (a part) of the first and second holding frames 23a, 23b are exposed from the casing 10, as shown in FIG. 3. Radiation fins 27a, 27b are formed on these outwardly exposed parts of the first and second holding frames 23a, 23b, that is, the outer circumferences of the first and second holding frames 23a, 23b, as shown in FIG. 4. That is, the first and second holding frames 23a, 23b are structured to serve also as a radiation part. The supporting frame 21 is constructed in contact with the holding frames 23a, 23b. Therefore, the heat of the liquid crystal light valve 2 is transmitted to the holding frames 23a, 23b via the supporting frame 21 and then radiated outward.

The first and second fixing frames 13a, 13b have their fixing holes 15a, 15b fixed in a snap-fitting manner to fixing hook parts 25a, 25b formed on the first and second holding frames 23a, 23b, as shown in FIG. 4. There is no problem in using screws to fix the first and second fixing frames 13a, 13b with the first and second holding frames 23a, 23b, but snap-fitting makes it easy to assemble, disassemble and reassemble these parts.

The radiation fins 27a, 27b of the first and second holding frames 23a, 23b are so shaped that the parts other than the fixing hook parts 25a, 25b of the first and second holding frames 23a, 23b and the fixing holes 15a, 15b of the fixing frames 13a, 13b can contact external air as much as possible.

A first cooling chamber (housing space) 17a in which the refrigerant 31 is sealed in such a manner that it can freely flow, is provided between the first cover glass 11a, and the first holding frame 23a and the TFT board 3, as shown in FIG. 5. Also, a second cooling chamber (housing space) 17b in which the refrigerant 31 is sealed in such a manner that it can freely flow, is provided between the second cover glass 11b, and the second holding frame 23b and the counter-board 4. That is, the TFT board 3, the counter-board 4 and the first and second holding frames 23a, 23b of the liquid crystal light valve 2 directly contact the refrigerant 31.

The refrigerant 31 sealed in the first and second cooling chambers 17a, 17b is water-based, in consideration of thermal conductivity and cost. Usually, an ethylene glycol or propylene glycol solution is used as the refrigerant 31 in consideration of freezing at low temperatures. Moreover, organic compounds such as defoamer and anticorrosive are added.

A light incident-side polarizer (polarization member) 18 and a light exiting-side polarizer (polarization member) 19 are provided on outer surfaces (outer sides) 11e, 11f that are opposite to inner surfaces 11c, 11d contacting the refrigerant 31, of the first cover glass 11a and the second cover glass 11b.

In the first and second cooling chambers 17a, 17b, the space formed between the first holding frame 23a and the first cover glass 11a and the space formed between the second holding frame 23b and the second cover glass 11b are refrigerant reservoirs 33a, 33b. As these refrigerant reservoirs are provided, the first and second cooling chambers 17a, 17b have large volumes and a required amount of the refrigerant 31 can be stored.

Next, convection driving unit will be described.

The convection driving units 30 are provided toward the first cooling chamber 17a and the second cooling chamber 17b, as shown in FIG. 5. As they have the same configuration, the convection driving unit 30 toward the first cooling chamber 17a will be described.

The convection driving unit 30 has a convection start plate (convection start unit) 34 provided in the refrigerant reservoir 33a, a rotation start plate 35 provided on the outer surface 11e of the first cover glass 11a and connected to the convection start plate 34 via the first cover glass 11a, and a driver (driving unit) 36 that is provided on an outer surface 13e of the first fixing frame 13a and drives the rotation start plate 35. That is, the convection start plate 34 is provided within the first cooling chamber 17a (within the casing 10), and the rotation start plate 35 and the driver 36 are provided outside of the first cooling chamber 17a and drive the convection start plate 34 from outside.

Specifically, the rotation start plate 35 is a flat electromagnetic motor and is rotated by the driving force of the driver 36. Convection start plate-side core members 37 and rotation start plate-side core member 38 are formed in the convection start plate 34 and the rotation start plate 35. The core members 37, 38 on both sides are magnets. The convection start plate 34 receives the rotation force of the rotation start plate 35, and as the convection start plate 34 follows the rotation force, it rotates about a rotation axis B formed in the first holding frame 23a. This causes forced convection in the first cooling chamber 17a and circulates the refrigerant 31.

The driver 36 has a driver control board 39 that controls the number of rotations of the rotation start plate 35 and the like, and the driver control board 39 is provided on the outer surface 13e of the first fixing frame 13a. The driver control board 39 is provided with a connection line (driving unit FPC) 40 as a flexible board connected to a projector body (not shown). The driver control board 39 may be situated toward the projector body.

Next, a method of cooling the liquid crystal light valve 2 by using the liquid crystal light valve unit 1 of this embodiment having the above configuration will be described.

First, the driver 36 is started to drive the rotation start plate 35. As the rotation start plate 35 rotates, the convection start plate 34 rotates. This causes the refrigerant 31 in the refrigerant reservoirs 33a, 33b to flow toward the image forming area A, and the heat of the liquid crystal light valve 2 is transmitted to the fluid. The refrigerant 31 is caused to flow toward the refrigerant reservoirs 33 by the convection generated by the convection start plate 34. The heat of the refrigerant 31 is radiated outward by the first and second holding frames 23a, 23b and the radiation fins 27a, 27b. That is, since the first and second holding frames 23a, 23b directly contact the refrigerant 31, the heat of the refrigerant 31 is quickly transmitted to the first and second holding frames 23a, 23b that are arranged nearby, and then is radiated broadly by the radiation fins 27a, 27b of the first and second holding frames 23a, 23b.

The refrigerant 31, cooled by having the heat radiated outward, is caused to flow again toward the image forming area A by the convection start plate 34, and the heat of the liquid crystal light valve 2 is transmitted to the refrigerant 31. The heat of the liquid crystal light valve 2 is also radiated by the first and second holding frames 23a, 23b via the supporting frame 21. At the same time when the liquid crystal light valve 2 is cooled, the light incident-side polarizer 18 and the light exiting-side polarizer 19 are cooled by the flow of the refrigerant 31 in the first and second cooling chamber 17a, 17b.

In the optical device 1 according to this embodiment, as forced convection is generated by the convection driving Unit 30 in the first and second cooling chambers 17a, 17b in which the refrigerant 31 is sealed, for example, thermal energy due to beams from the light source can be efficiently lowered in the liquid crystal light valve 2. That is, though the cooling efficiency is overwhelmingly low in a free convection system, the cooling efficiency leaps as the refrigerant 31 in the first and second cooling chambers 17a, 17b is caused to flow even slightly by the convection driving unit 30.

Moreover, the refrigerant reservoirs 33a, 33b, the convection driving unit 30, and the first and second holding frames 23a, 23b radiating heat, are provided within the casing 10, instead of providing a refrigerant storing unit, a convection start unit and a radiation unit separately from a liquid crystal light valve as is often the case with traditional forced convection-type liquid cooling. Therefore, the liquid crystal light valve unit 1 that is small-sized and that can avoid weight loss due to leakage of the refrigerant 31 and avoid entry of dust, bubbles and the like, can be provided.

As the radiation fins 27a, 27b are provided in the parts of the first and second holding frames 23a, 23b that are exposed outside of the casing 10, the liquid crystal light valve 2 can be cooled more efficiently. That is, the liquid crystal light valve 2 can be cooled sufficiently without arranging a large external radiator.

The liquid crystal light valve unit 1 according to this embodiment of the invention does not need any pipe for transporting the refrigerant or connection member, and for example, the assembly of a dichroic prism used in a projector is similar to the assembly of a traditional light valve. Therefore, the assembly is easy.

Second Embodiment

Next, a second embodiment of the invention will be described with reference to FIGS. 6 to 9. In each of the embodiments described below, the same parts as in the configuration of the liquid crystal light valve unit 1 according to the first embodiment are denoted by the same numerals and will not be described further in detail.

A liquid crystal light valve unit according to this embodiment differs from the first embodiment in that a piezoelectric ultrasonic motor is used as a driver (driving unit) 50.

The piezoelectric ultrasonic motor (PZT motor) 50 has a rotatable rotor (rotation start plate of the first embodiment) 51 and a stator (vibrator) 52 having a protrusion 56 contacting the lateral side of the rotor 51, as shown in FIG. 6.

The rotor 51 is made of stainless steel and its lateral side is a driving surface.

The stator 52 has a configuration in which thin plate-like piezoelectric elements (piezoelectric ceramics) 53 are provided on both sides of a stainless steel shim (thin plate) 54, as shown in FIG. 7, and its total thickness is 0.4 mm. These two piezoelectric elements 53 are so arranged that their directions of polarization are as shown FIG. 7. The planar dimension of the piezoelectric element 53 is approximately 7 mm by 2 mm. The electrode on the outer surface of the piezoelectric element 53 is divided into three in the y-direction as shown in FIG. 6, and of these three divided electrodes, the electrode near end parts 52a, 52b is divided into two in the x-direction. Thus, the electrode is divided into five in total. That is, the electrodes include an electrode A near the end part 52a and a lateral side 53a, an electrode B near the end part 52a and a lateral side 53b, a central electrode C, an electrode D near the end part 52b and the lateral side 53a, and an electrode E near the end part 52b and the lateral side 53b.

Supporting units 55 that serve for holding and continuity are provided on the lateral sides in the direction of width of the stator 52. As a pressure toward the rotor 51 is applied via these supporting units 55, vibrations of the stator 52 are transmitted to the rotor 51 by friction.

Next, the operation of the piezoelectric ultrasonic motor 50 of this embodiment having the above configuration will be described.

First, when an AC signal of approximately 300 kHz is applied between the electrodes A, C, E and the shim 54, vertical linear standing waves shown in FIG. 8A and curved quadratic standing waves shown in FIG. 8B are excited. In the piezoelectric ultrasonic motor 50 with such a shape, since the difference between the vertical linear and curved quadratic resonance frequencies is as small as approximately 3 to 6 kHz, vibrations in a mixed mode occur. As a result of such vibrations, the distal end of the protrusion 56 forms an elliptic locus and realizing highly efficient driving.

As the voltage applying position is switched to the electrodes B, C and D, the direction of the elliptic vibrations is reversed and the rotor 51 rotates in the reverse direction. This rotation of the rotor 51 causes the convection start plate 34 to rotate.

In the liquid crystal light valve unit according to this embodiment, a large torque can be generated with a small size by using a piezoelectric ultrasonic motor 50. That is, when the torque is not enough to rotate the convection start plate 34, the piezoelectric ultrasonic motor 50 is fixed to the first fixing frame 13a by a fixing screw 57, and the rotor 51 is connected directly with the convection start plate 34, as shower in FIG. 9, thereby enabling provision of a liquid crystal light valve unit having a small size and a large torque. In this case, in order to prevent leakage of the refrigerant 31 from a rotary shaft C that connects the rotor 51 with the convection start plate 34, packings (O rings) 59 are provided between a bearing 58 and the rotary shaft C and between the bearing 58 and the first cover glass 11a. If the liquid crystal light valve unit has an enough space to form a driver therein, a thin brushless motor having a large torque or a small motor with a decelerator may be used instead of using the piezoelectric ultrasonic motor 50.

Third Embodiment

Next, as a third embodiment of the invention, a projector having the liquid crystal light valve unit 1 of the first embodiment will be described.

Figure 10:
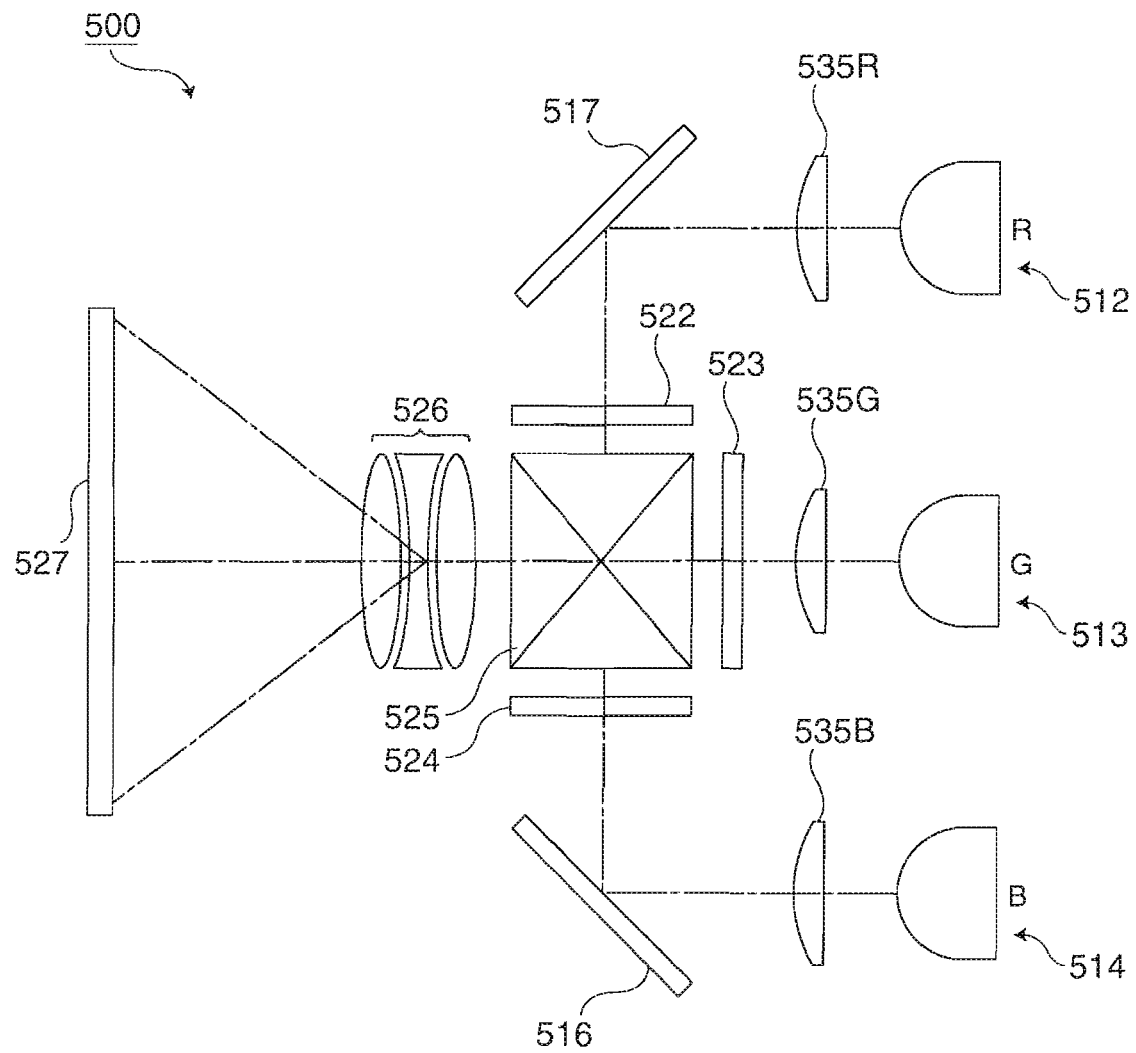
FIG. 10 is a plan view showing a schematic configuration of a projector according to a third embodiment of the invention.

FIG. 10 is an explanatory view of a projector 500 having the liquid crystal light valve unit 1 of the embodiment.

Figure 11:
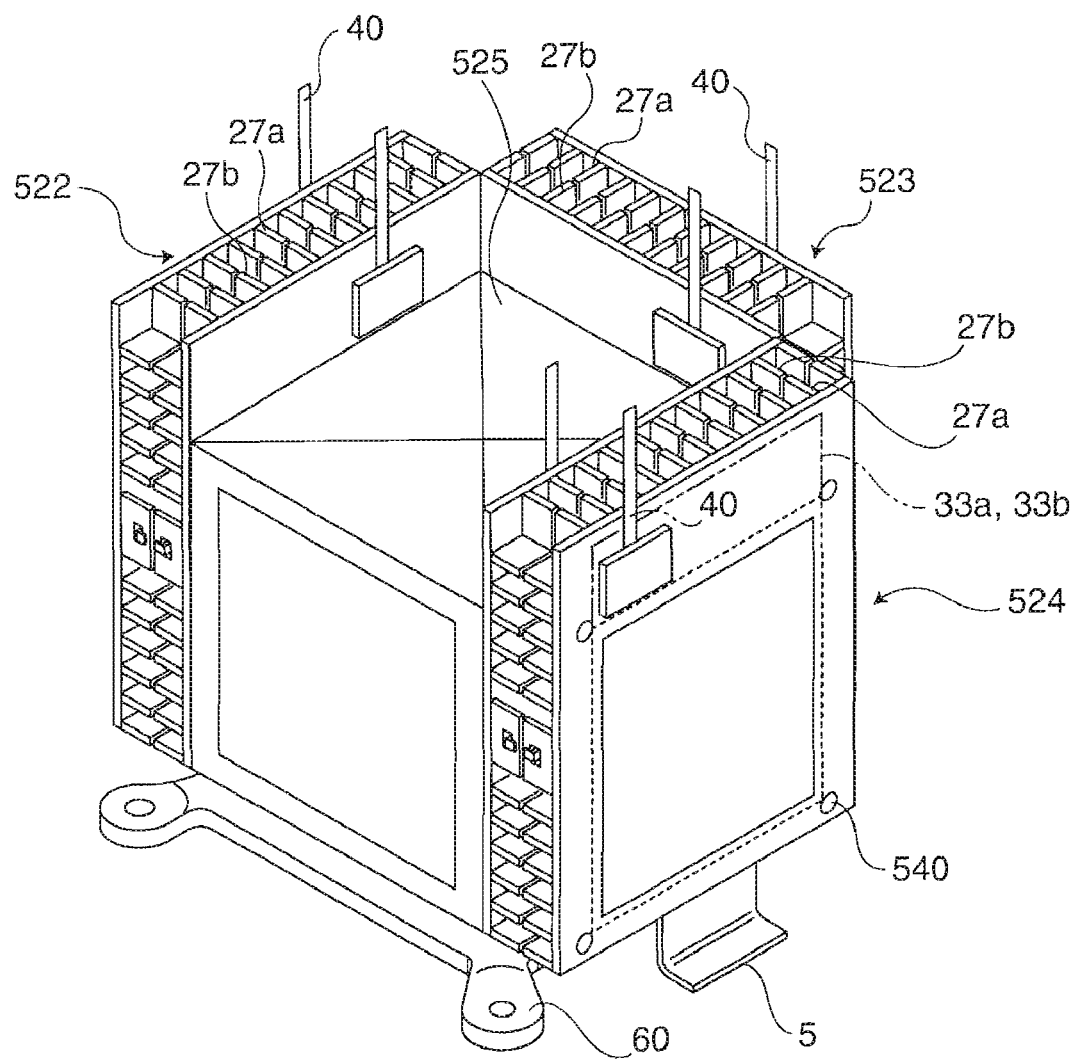
FIG. 11 is a perspective view showing an optical device used for the projector of FIG. 10.

The projector 500 has light sources 512, 513, 514, a liquid crystal light valve unit for red light 522, a liquid crystal light valve unit for green light 523, a liquid crystal light valve unit for blue light 524, a dichroic prism (light combining unit) 525 that combines the color lights emitted from the respective liquid crystal light valve units 522, 523, 524, and a projection lens 526 that projects an optical image combined by the dichroic prism 525. The liquid crystal light valve units 522, 523, 524 are fixed to a dichroic prism fixing member 545 by positioning holes 540 along the lateral sides of the dichroic prism 525, as shown in FIG. 11. In this embodiment, since it is assumed that a refrigerant of high temperatures is moved upward by convection, the refrigerant reservoirs 33a, 33b of the liquid crystal light valve units 522, 523, 524 are arranged in their upper parts. In the case where It is suspended from the ceiling, the refrigerant reservoirs 33a, 33b may be arranged In the lateral parts in the drawing.

The light sources 512, 513, 514 employ LED chips that emit red (R), green (G) and blue (B), respectively. As an even illumination system to provide even illuminance distribution of the light from the light sources, a rod lens or a fly-eye lens may be arranged on the rear side from each light source.

A luminous flux from the red light source 512 is transmitted through a superimposing lens 535R, then reflected by a reflection mirror 517, and becomes incident on a liquid crystal light valve for red light 522R (not shown) of the liquid crystal light valve unit for red light 522. A luminous flux from the green light source 513 is transmitted through a superimposing lens 535G and becomes incident on a liquid crystal light valve for green light 523G (not shown) of the liquid crystal light valve unit for green light 523

A luminous flux from the blue light source 514 is transmitted through a superimposing lens 535B, then reflected by a reflection mirror 516, and becomes incident on a liquid crystal light valve for blue light 524B of the liquid crustal light valve unit for blue light 524. As the luminous fluxes from the respective light sources pass through the superimposing lenses, the luminous fluxes are superimposed with each other in display areas of the liquid crystal light valves, and the liquid crystal light valves are illuminated evenly. Of the luminous fluxes from the light sources 512, 513, 514, only linearly polarized light in a predetermined direction is transmitted through the light incident-side polarizer and becomes incident on each liquid crystal light valve unit 522, 523, 524.

The three color lights modulated by the respective liquid crystal light valve units 522, 523, 524 become incident on the dichroic prism 525. This prism is formed by bonding four right-angled prisms, and on its inner surfaces, a dielectric multilayer film to reflect red light and a dielectric multilayer film to reflect blue light are arranged in a cross-shape. The three color lights are combined by these dielectric multilayer films, thus forming light representing a color image. The combined light is projected onto a projection screen 527 by a projection lens 526, which is a projection system, thus displaying an enlarged image.

Since the projector 500 of this embodiment has the liquid crystal light valve unit for red light 522, the liquid crystal light valve unit for green light 523 and the liquid crystal light valve unit for blue light 524 in which entry of dust to the refrigerant is restrained, a sharper image can be projected onto the projection screen 527.

As the liquid crystal light valve units 522, 523, 524 are used in the projector 500, only the light valve FPC 5 and the connection line 40 are the connecting parts between the liquid crystal light valve unit 1 and the projector body, except for a mechanical fixing part 60 that also serves for positioning. Therefore, miniaturization of the projector 500 as a whole can be realized.

Figure 12:
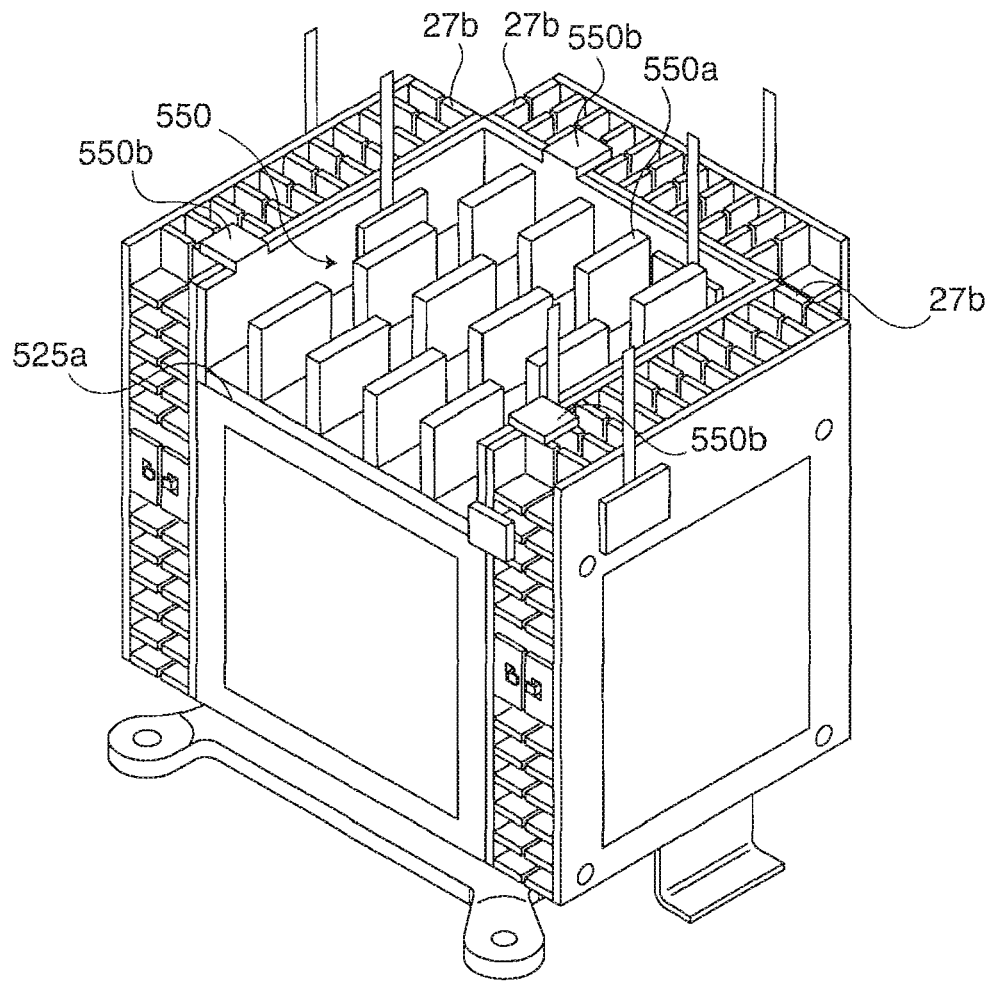
FIG. 12 is a perspective view showing a modification of the projector according to the third embodiment of the invention.

If the radiation fins 27a, 27b cannot be sufficiently provided on the holding frames of the liquid crystal light valve units 522, 523, 524, or if the device is of a high-luminance type and its quantity of radiation is insufficient, a radiation unit 550 contacting the radiation fins 27b of the liquid crystal light valve units 522, 523, 524 and having plural radiation fins 550a may be provided on an upper surface (where the liquid crystal light valve units 522, 523, 524 are not provided) 525a of the dichroic prism 525, as shown in FIG. 12. In this configuration, since contact pieces 550b contacting the radiation fins 27b are provided on the radiation unit 550 and the radiation unit 550 can thus radiate the heat of the radiation fins 27b, the electrothermal efficiency can be improved. In this case, the radiation unit 550 is provided on the upper surface 525a of the dichroic prism 525, but it is not limited to the upper surface 525a of the dichroic prism 525 if there is an enough space within the projector body.

The technical field of the invention is not limited to the embodiments. Various changes can be made without departing from the scope of the invention.

Figure 13:
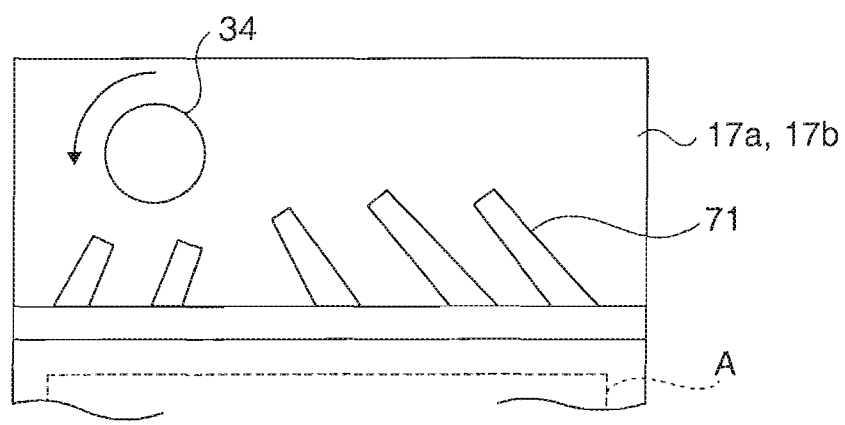
FIG. 13 is a plan view showing a modification of the optical device according to each embodiment of the invention.

For example, rectifying protrusions (rectifying members) 71 that diffuses the refrigerant 31 may be provided in the first and second cooling chambers 17a, 17b, as shown in FIG. 13. This configuration enables smoothing of the flow of the fluid around the convection start plate 34. Thus, since the influence of a turbulent flow on the image forming area A can be restrained, the turbulence of the luminous flux transmitted through the liquid crystal light valve 2 can be reduced. It is preferable that the rectifying protrusions 71 are formed in the refrigerant reservoirs 33a, 33b, which are outside of the image forming area A. However, if they are made of transparent members, they may be formed in the image forming area A.

The convection start plate 34 is formed in the refrigerant reservoirs 33a, 33b of the first and second cooling chambers 17a, 17b. However, the convection star plate 34 may be formed in the image forming area A as long as it is formed in the first and second cooling chambers 17a, 17b. In this case, it is preferable that the convection start unit 34 is a transparent member in order to restrain the influence on an image.

The first and second cooling chambers 17a, 17b are provided on both sides of the liquid crystal light valve 2. However, depending on the calorific value and application, a cooling chamber may be provided only on one side.

The driver 36 that drives the convection start plate is provided outside, but it may be provided within the casing 10. In this configuration, it is preferable that the driver is provided, for example, at a part of the first and second holding frames 23a, 23b in order to prevent entry of dust and the like.

The one convection start plate 34 is provided, but plural convection start plates may be provided. In this configuration, the convection of the refrigerant 31 can be increased. However, in consideration of the turbulence of the flow and the cost of the driving source, a smaller number of convection start plates are preferred. Magnets are used as the convection start plate-side core member 37 and the rotation start plate-side core member 38, but one of these core members 37, 38 may be a magnet. Alternatively, an electrostatic force may be used instead of magnets.

The first cooling chamber 17a and the second cooling chamber 17b are separately provided near the TFT board 3 and near the counter-board 4, respectively. However, a continuing path may be formed at a part of the first and second holding frames 23a, 23b. Since this configuration enables movement of the refrigerant 31 between the first cooling chamber 17a and the second cooling chamber 17b, it suffices to provide the convection driving unit 30 in one of the first cooling chamber 17a and the second cooling chamber 17b.

Figure 14:
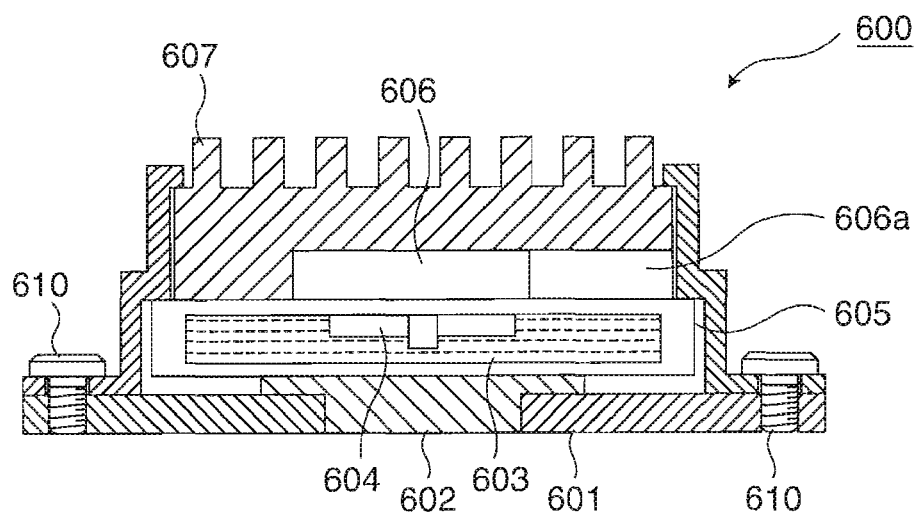
FIG. 14 is a plan view showing a modification of the optical device according to each embodiment of the invention.

In each of the embodiments a transmissive liquid crystal element is used as the light modulation element. However, the light modulation element is not limited to this and, for example, a liquid crystal light valve unit 600 using a DMD (digital micromirror device) element 602, which is a reflective light modulation element, may be employed. This configuration includes the DMD element 602 held between boards 601, a convection start plate 604 provided in a refrigerant 603, a driver 606 provided outside of a cooling chamber 605 and connected with a driving circuit 606a that drives the convection start plate 604, and a radiation member 607 in contact with the cooling chamber 605, as shown in FIG. 14. The radiation member 607 may be integrated with the cooling chamber 605. The connection of the driving circuit 606a of the driver 606 and the board 601 can be made common. This liquid crystal light valve unit 600 is to be fixed at a predetermined position with fixing screws 610.

Figure 15:
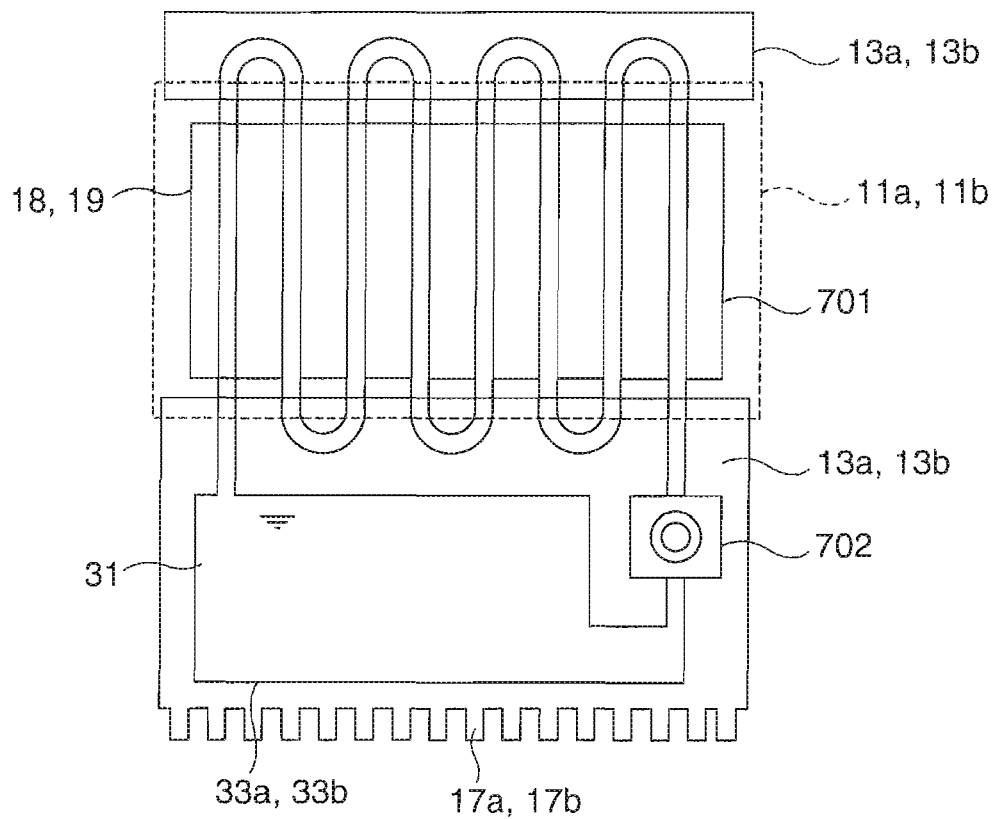
FIG. 15 is a plan view showing a modification of the optical device according to each embodiment of the invention.

The light incident-side polarizer 18 and the light exiting-side polarizer 19 are cooled by the refrigerant 31 in the first cooling chamber 17a and the second cooling chamber 17b. However, a transparent pipe 701 that are circulating in the refrigerant reservoirs 33a, 33b and in which convection of the refrigerant 31 is possible, and a gear pump 702 that sends the refrigerant 31 into the transparent pipe 701 may be provided, and this transparent pipe 701 may be brought in contact with the first and second cover glasses 11a, 11b, thus cooling the light incident-side polarizer 18 and the light exiting-side polarizer 19, as shown in FIG. 15. This configuration enables better cooling of the light incident-side and light exiting-side polarizers 18, 19.

Figure 16:
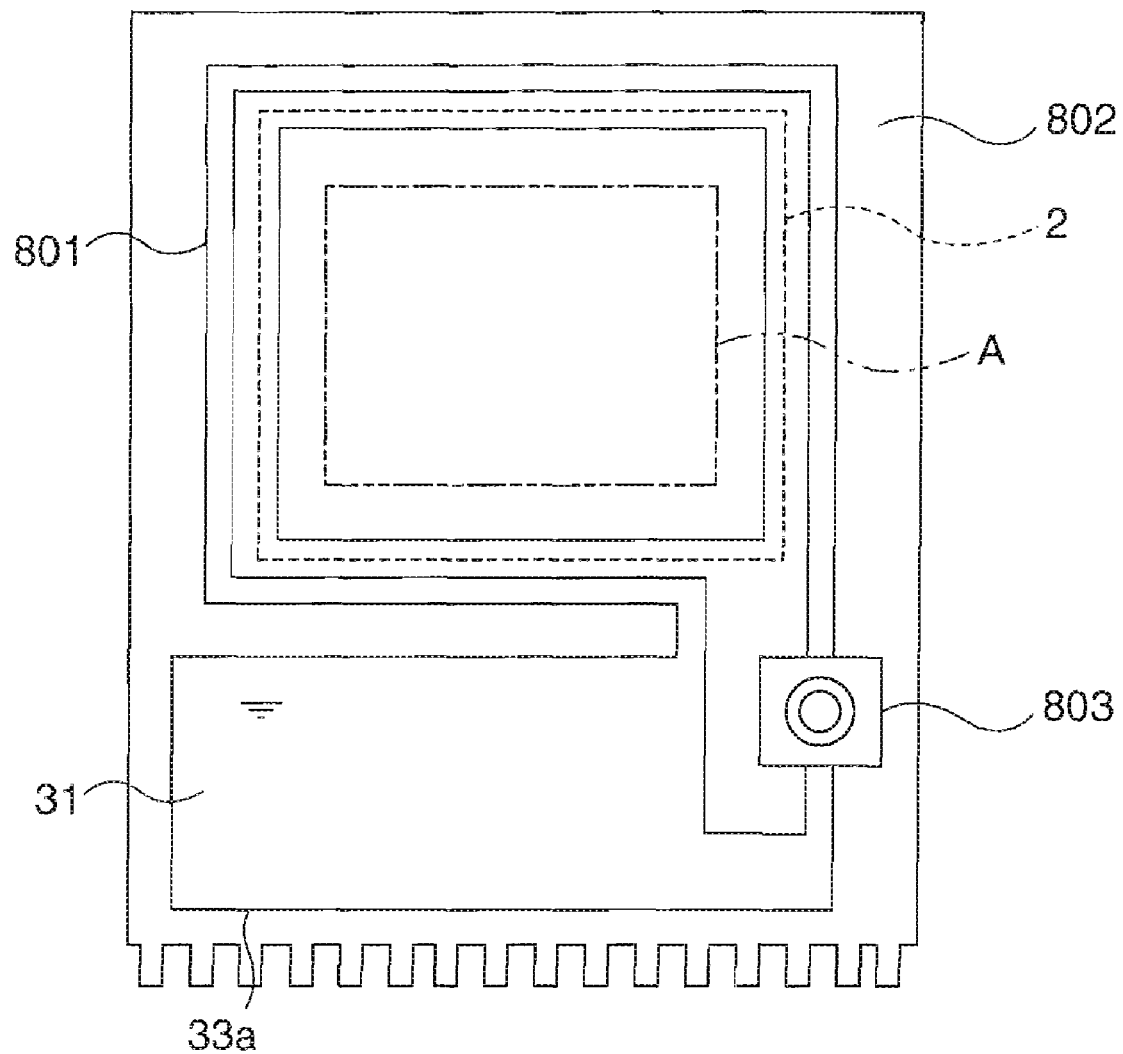
FIG. 16 is a plan view showing a modification of the optical device according to each embodiment of the invention.

Moreover, a fixing frame 802 having a follow part 801 circulating to the refrigerant reservoir 33a, and a gear pump 803 that sends the refrigerant 31 into the hollow part 801 may be provided around the image forming area A, as shown in FIG. 16. The liquid crystal light valve 2 may be fixed by the fixing frame 802 and the refrigerant 31 may be circulated in the hollow part 801, thus causing forced convection. In this configuration, since the refrigerant 31 does not flow in the image forming area A, the risk of degradation in image quality can be restrained.

The entire disclosure of Japanese Patent Application No. 2006-059965, filed Mar. 6, 2006 is expressly incorporated by reference herein.

What is claimed is:

1. An optical device comprising:
   a light modulation element that modulates a luminous flux emitted from a light source;
   a casing that houses the light modulation element;
   a holding member that holds the light modulation element, the holding member having a part exposed to the outside;
   a refrigerant housed in a housing space surrounded by the casing, the holding member and the light modulation element; and
   a convection start unit that is provided in the casing, the convection start unit rotates about a rotation axis to cause convection of the refrigerant.

2. The optical device according to claim 1, wherein the convection start unit is provided on the holding member.

3. The optical device according to claim 1, wherein the light modulation element is a transmissive liquid crystal element,
   a refrigerant reservoir that stores a part of the refrigerant is provided around an image forming area of the light modulation element in the housing space, and
   the convection start unit is provided in the refrigerant reservoir.

4. The optical device according to claim 3, wherein a polarization member is provided on an outer side of a cover glass that forms the housing space.

5. The optical device according to claim 1, wherein a rectifying member that rectifies the flow of the refrigerant is provided in the housing space.

6. The optical device according to claim 1, wherein a driving unit that drives the convection start unit is provided outside of the casing.

7. The optical device according to claim 6, wherein the driving unit is an electromagnetic motor or piezoelectric ultrasonic motor.

8. The optical device according to claim 1, wherein a radiation fin is provided at the part of the holding member that is exposed outward from the casing.

9. A projector comprising:
   a light source that emits light;
   plural optical devices that include the optical device according to claim 1;
   a light combining unit that has lateral side which is arranged along the plural optical devices, and combines color lights emitted from the plural optical devices; and
   a projection unit that projects an optical image combined by the light combining unit.

10. The projector according to claim 9, further comprising a radiation unit in contact with the holding members of the plural optical devices.

11. The projector according to claim 10, wherein the light combining unit is a dichroic prism and the radiation unit is provided on a surface of the dichroic prism where the plural optical devices are not provided.

12. An optical device, comprising:
    a light modulation element that modulates a luminous flux emitted from a light source;
    a casing that houses the light modulation element;
    a holding member that holds the light modulation element, the holding member having a part exposed to the outside;
    a refrigerant housed in a housing space surrounded by the casing, the holding member and the light modulation element; and
    a convection start unit that is provided in the casing and causes convection of the refrigerant, the convection start unit having a driving unit that drives the convection start unit, the driving unit being provided outside of the casing.

13. The optical device according to claim 12, wherein the driving unit is an electromagnetic motor or piezoelectric ultrasonic motor.

14. An optical device for use with a light source that emits light, the optical device comprising:
    a light modulation element that modulates the light emitted from the light source;
    a casing;
    a holding member that holds the light modulation element;
    a cooling chamber surrounded by the casing, the holding member and the light modulation element;
    coolant disposed in the cooling chamber, and
    a convector provided in the casing and rotatable to cause convection of the coolant.

* * * * *